United States Patent
Wark et al.

(10) Patent No.: US 9,794,730 B2
(45) Date of Patent: Oct. 17, 2017

(54) ENERGY MANAGEMENT FOR WIRELESS SENSOR NETWORKS

(71) Applicant: Commonwealth Scientific and Industrial Research Organisation, Campbell (AU)

(72) Inventors: Timothy John Wark, The Gap (AU); Raja Jurdak, Taringa (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 0 days.

(21) Appl. No.: 14/938,601

(22) Filed: Nov. 11, 2015

(65) Prior Publication Data

US 2016/0269854 A1    Sep. 15, 2016

Related U.S. Application Data

(63) Continuation of application No. 13/265,800, filed as application No. PCT/AU2010/000369 on Mar. 31, 2010, now abandoned.

(30) Foreign Application Priority Data

Mar. 31, 2009    (AU) ................ 2009901388

(51) Int. Cl.
*G01W 1/14* (2006.01)
*H04W 4/00* (2009.01)
*G01D 1/00* (2006.01)
*G01D 15/00* (2006.01)

(52) U.S. Cl.
CPC ............. *H04W 4/006* (2013.01); *G01D 1/00* (2013.01); *G01D 15/00* (2013.01)

(58) Field of Classification Search
CPC ............. H04W 4/006; H04W 52/0216; H04W 52/0219; H04W 52/0274; H04W 40/10; H04Q 2209/40; H04Q 2209/886; G06F 17/18; G06F 17/30241; G06F 11/0736; G01N 33/24; G01N 33/246; G06N 5/00; G06N 5/02; G01W 1/00; G01W 1/14; A01G 25/167; A01G 25/16; A01B 79/005
See application file for complete search history.

(56) References Cited

PUBLICATIONS

Cardell-Oliver et al., A Reactive Soil Moisture Sensor Network: Design and Field Evaluation, 2005, International Journal of Distributed Sensor Networks, vol. 1, pp. 149-162.*

* cited by examiner

*Primary Examiner* — Toan Le
(74) *Attorney, Agent, or Firm* — Brinks Gilson & Lione

(57) ABSTRACT

This invention concerns remote sensor networks, and particularly energy management for wireless sensor networks. In a first aspect the invention is a wireless sensor node specified to operate for a given lifetime, including an onboard computer system and a set of one or more associated sensors. The computer system operates to periodically sample data from each sensor of the set of associated sensors, and to store a multi-state model representing one or more phenomena described by the collected data. And, the computer system operates to calculate a value associated with movement of the phenomena between the states of the multi-state model, and to adjust the rate of sampling of one or more of the set of associated sensors depending on the calculated value. In other aspects the invention is a network of sensor nodes and a method of operation.

20 Claims, 6 Drawing Sheets

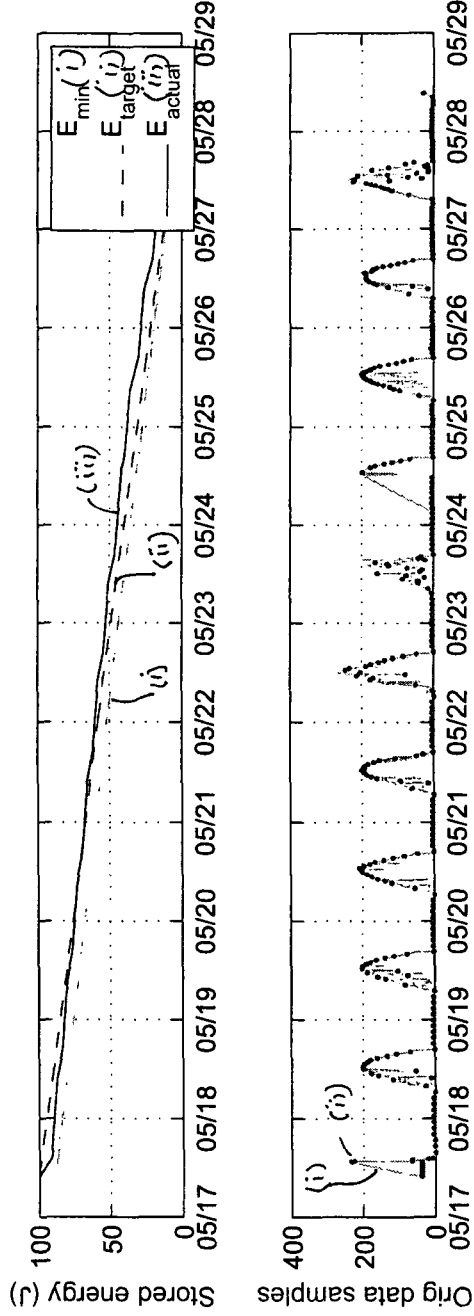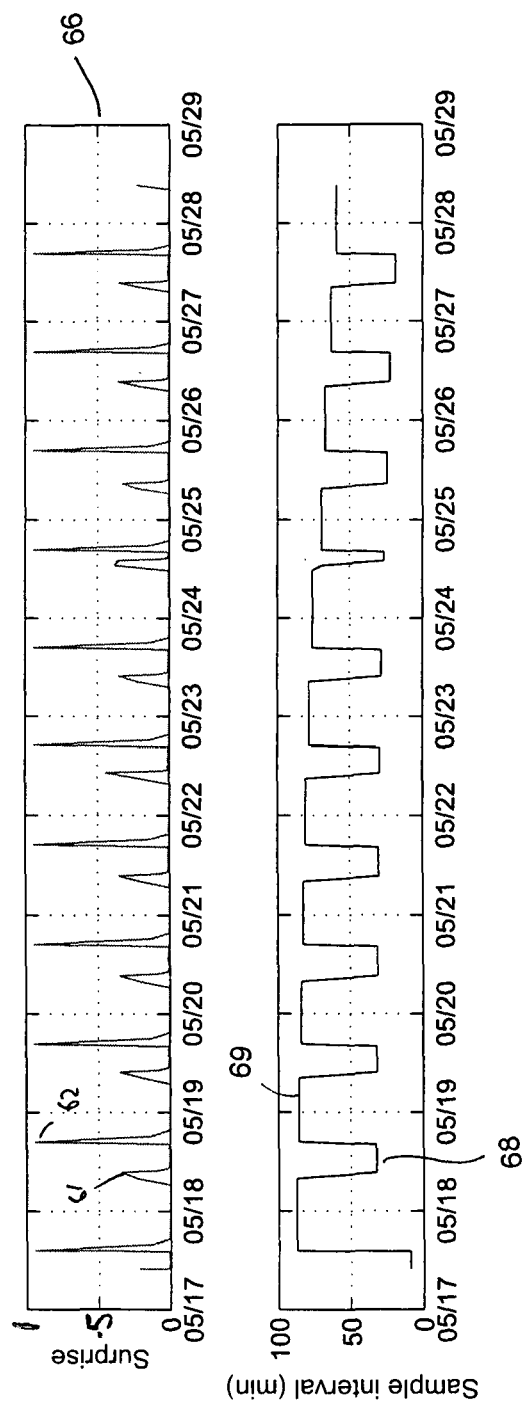
Fig. 6 (a)
Fig. 6 (b)
Fig. 6 (c)
Fig. 6 (d)

ENERGY MANAGEMENT FOR WIRELESS SENSOR NETWORKS

CROSS-REFERENCE TO RELATED APPLICATIONS

This application is a continuation of U.S. application Ser. No. 13/265,800, pending, which is a National Stage of International Application No. PCT/AU2010/000369 filed on Mar. 31, 2010, which claims priority to Australian Patent Application No. 2009901388 filed with the Australian Patent Office on Mar. 31, 2009, wherein the entirety of each of the aforementioned applications is hereby incorporated herein by reference.

TECHNICAL FIELD

This invention concerns remote sensor networks, and particularly energy management for wireless sensor networks. In a first aspect the invention is a sensor node. In other aspects the invention is a network of sensor nodes and a method of operation.

BACKGROUND ART

In the relevant research literature, the thrust of energy management has been directed toward adjustment of the sampling frequency to conserve energy. For instance, U.S. Pat. No. 7,318,010 (Anderson) describes a node utilizing a fixed energy management plan which is downloaded to a sensor node and then used to adjust the sampling rates of the sensors reporting to that node. Although such protocols may enable nodes to last for a specified lifetime, they do not necessarily return the most useful range of information from the node during that lifetime.

DISCLOSURE OF THE INVENTION

In a first aspect the invention is a wireless sensor node specified to operate for a given lifetime, comprising an onboard computer system and a set of one or more associated sensors. The computer system operates to periodically sample data from each sensor of the set of associated sensors, and to store a multi-state model representing one or more phenomena described by the collected data. And, the computer system operates to calculate a value associated with movement of the phenomena between the states of the multi-state model, and to adjust the rate of sampling of one or more of the set of associated sensors depending on the calculated value.

The main advantage is not only that the invention ensures continuing operation of the node for a specified lifetime, but also that it able to select the best behaviour for the node depending upon the state the phenomena is most likely to be in at any given time.

For example, a node might be monitoring the phenomena of daylight, and to do this the node may have one or more associated light sensors. This node could set a lower sampling rate for all the sensors during the night (when the phenomena is in a dark state), and a higher rate during the day (when the one or more sensors are exposed to daylight and the phenomena is in a light state). The phenomena transitions from the dark to light states at dawn, when an increase in light levels from darkness is first detected; and at dusk it transitions back to the dark state when the beginning of the opposite transition is first detected. These transitions are reflected in the multi-state model as changes of state.

The multi-state model may include an entropy for each state, defining the average information contained in the phenomena when in that state.

The multi-state model may also include a probability mass function (PMF) for each state to describe the likelihood of a measurement returning a particular value while the phenomena is in that state.

The multi-state model may include a transition weight for each respective transition between states, defining the likelihood of each transition; or no transition.

Each cycle of operation of the computer system of a sensor node may involve:

Collecting a set of fresh data from the set of sensors.
Using the fresh set of data to generate a new likelihood value for the most likely state the phenomena is in.
Calculating a value representing an index of 'surprise' associated with movements of the phenomena, by comparing the new likelihood value with the immediately preceding likelihood value.
Comparing the value representing the index of 'surprise' with a threshold.
Calculating, depending on the outcome of the comparison with the threshold, a new highest average sampling rate for the node in that state that will still result in the energy stored at the node being sufficient to continue operating the node for the user-specified lifetime.
And, setting a new sampling rate for each sensor of the node, either above or below the new highest average sample rate, in proportion with the likelihood (PMF) of that node's current most likely state compared to the other states of the phenomena.

The invention is especially useful for nodes that have a range of different types of sensors where it is useful to determine how to best allocate energy (sampling rate) between each type of sensor. For instance, a node that monitors daylight may have a light sensor and an ultraviolet (UV) sensor. In this case there could be four states of the phenomena; day, night, sunrise and sunset.

In this example transitions in light levels may not trigger changes from the day or night states unless corroborated by data from the UV sensor. This may, for instance, prevent an increase in sampling rate of the light sensor resulting from exposure to artificial night-time illumination. The node may also be arranged to increase the sampling rate of the UV sensor for a period of time after the data from the light sensor exhibits a change by more than a predetermined threshold. The overall effect might be that the UV sensor is sampled more frequently when events occur that could be dawn or dusk, whereas the light sensor is sampled more frequently only during the daylight hours. Many other variations are possible, for instance it may be possible to stop sampling a particular sensor when the phenomena is in a particular state.

In this example, each cycle of operation of the computer system of a sensor node may involve the additional step of setting a new sampling rate for each of the set of sensors associated with that sensor node, according to a predetermined regime for that state of the phenomena.

A statistical model may automatically learn about the nature of each phenomena and determine an optimal function for assigning sampling frequencies to the state of the phenomena. Such a statistical model may monitor the rate of change of the data from the sensors to identify peaks of 'surprise'.

The automatic learning may take place on a computer at the network hub. Once an optimal function is determined a corresponding algorithm may be downloaded to the node where it assigns new sampling frequencies as required.

Alternatively, the automatic learning may take place on each sensor node.

In either event initial values for the likelihoods and weights may be manually seeded before the learning process commences.

A battery powered wireless sensor node may make good use of the invention. A sensor node that harvests energy, such as solar power, may also make good use of the invention; whether or not it had battery back-up.

This invention may enable true long-term deployments of sensor networks where each sensor node can be guaranteed to last a specified lifetime. This is particularly important for outdoor, environmental sensing where replacement of energy storage is time-consuming and expensive, and energy harvesting is typically unpredictable.

In a second aspect the invention may be applied over a network of sensor nodes. In a network each node periodically announces its residual energy value and the minimum energy of any neighbor node along it reporting path. In this way each node learns the minimum residual energy in its region of the network, and is able to set its sensor sampling rates in order to conserve sufficient energy at critical nodes of the network along its reporting path.

In a third aspect the invention is a method for operating a sensor node comprising an onboard computer system and a set of one or more associated sensors, wherein the node is specified to operate for a given lifetime. Or a network of such sensor nodes. The method comprising the steps of:
  Periodically sampling data from a set of one or more sensors associated with a sensor node.
  Storing a multi-state model representing one or more phenomena described by the collected data.
  Calculating a value associated with movement of the phenomena between the states of the multi-state model.
  Adjusting the rate of sampling of one or more of the set of associated sensors depending on the calculated value.

BRIEF DESCRIPTION OF THE DRAWINGS

An example of the invention will now be described with reference to the accompanying drawings, in which:
FIG. 6(a) is a series of three graphs showing
    (i) the minimum level of stored energy in a sensor node over its lifetime.
    (ii) the target level of stored energy in a sensor node over its lifetime.
    (iii) the actual level of stored energy in a sensor node over its lifetime.
FIG. 6(b) is a graph showing the samples of data received from a sensor, where:
    (i) is the original ground truth data including with samples collected from the sensor (that is not using the invention), and
    (ii) is the samples returned using the invention.
FIG. 6(c) is a graph showing index of 'surprise'.
FIG. 6(d) is a graph showing the changes in sampling resulting from use of the invention.

BEST MODES OF THE INVENTION

Figure 1:
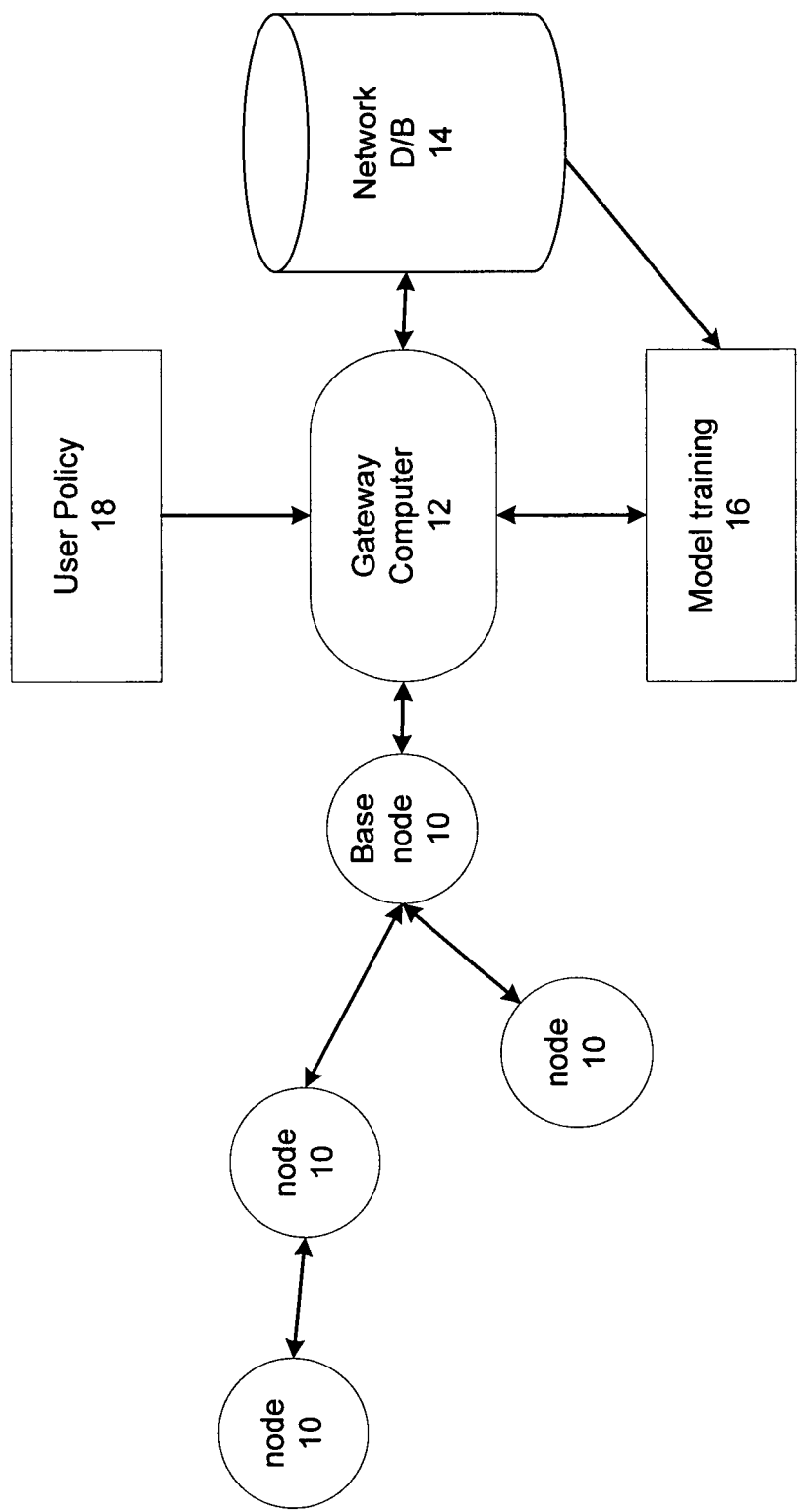
FIG. 1 is a diagram of system architecture.

Referring first to FIG. 1 an array of multiple sensor nodes 10 are deployed to collect sensor data. The nodes 10 communicate in multi-hop fashion to deliver the data along a reporting path to a gateway computer 12 at the network hub. The data is subsequently stored in a historical record at a backend database 14 connected to the gateway computer 12.

Based on the historical data, an offline learning and training model 16 learns patterns in the historical data. The patterns are then used to identify the various physical phenomena that can occur in the current deployment, and these phenomena are each mapped to a finite set of sensor states. The training model 16 also learns the likelihood, of each sensor 10 being in each of their states.

A sensor network user then sets a desired application policy 18, which includes any one or more of at least the following:
  The network lifetime.
  The maximum and minimum sampling rates of each type of sensor.
  The possible states for each sensor that relate to physical phenomena.
  The entropy of each of these states. And,
  The exponential decay function of stored energy for each sensor.

Each of these policy specifications may alternatively be learned offline by the system learning and training model 16.

Figure 2:
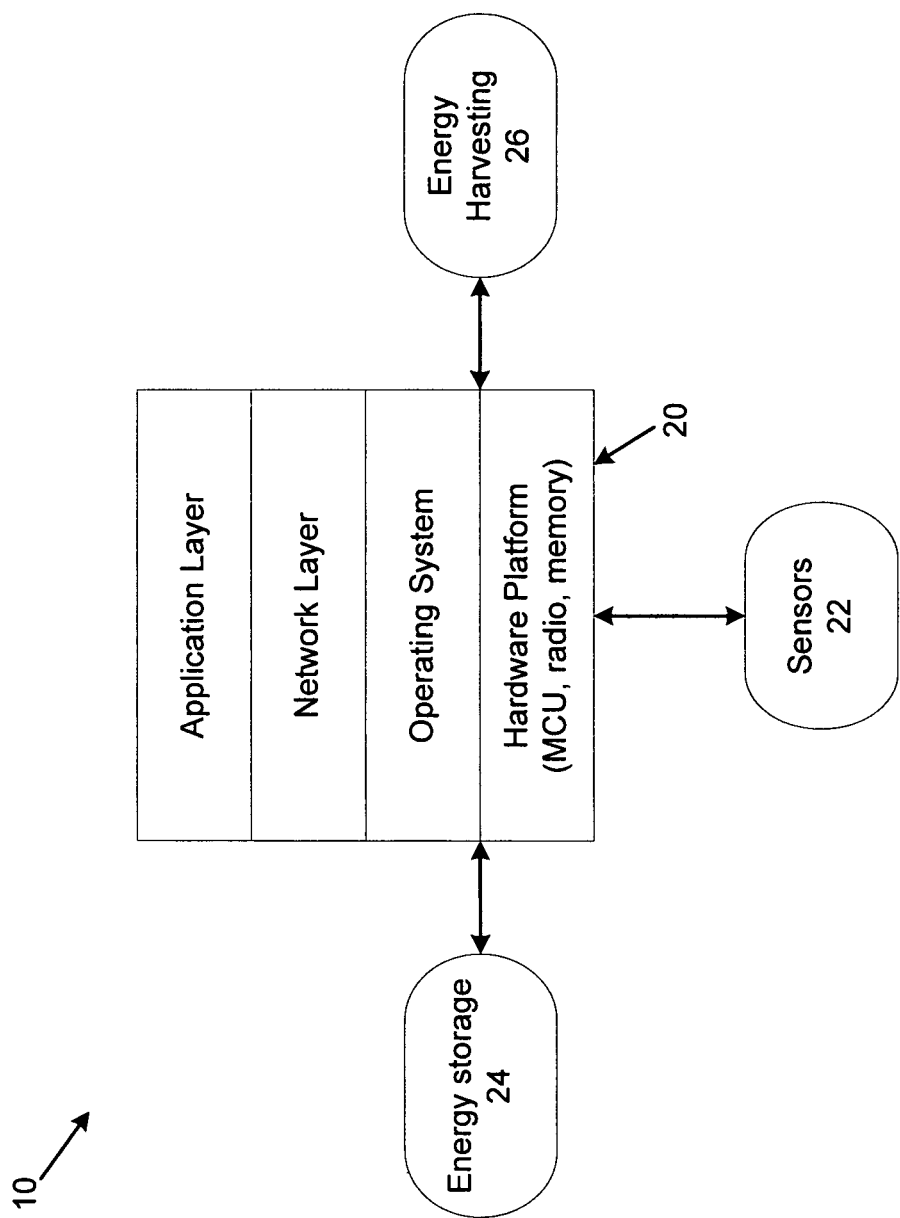
FIG. 2 is a diagram of sensor node architecture.

Referring now to FIG. 2, the internal node 10 architecture includes a hardware platform 20, which performs computation, communications, and local information storage. To do this the hardware is programmed with an operating system, and includes a network layer and an application layer. A set of sensors 22 are attached to the platform 20. Each sensor 22 has its own range of sampling rates based on the user policy and the likely information content of the sampled data. An energy storage module 24 tracks the current amount of energy stored at the node. An energy harvesting module 26 tracks the energy harvested by the node through solar or other means.

Figure 3:
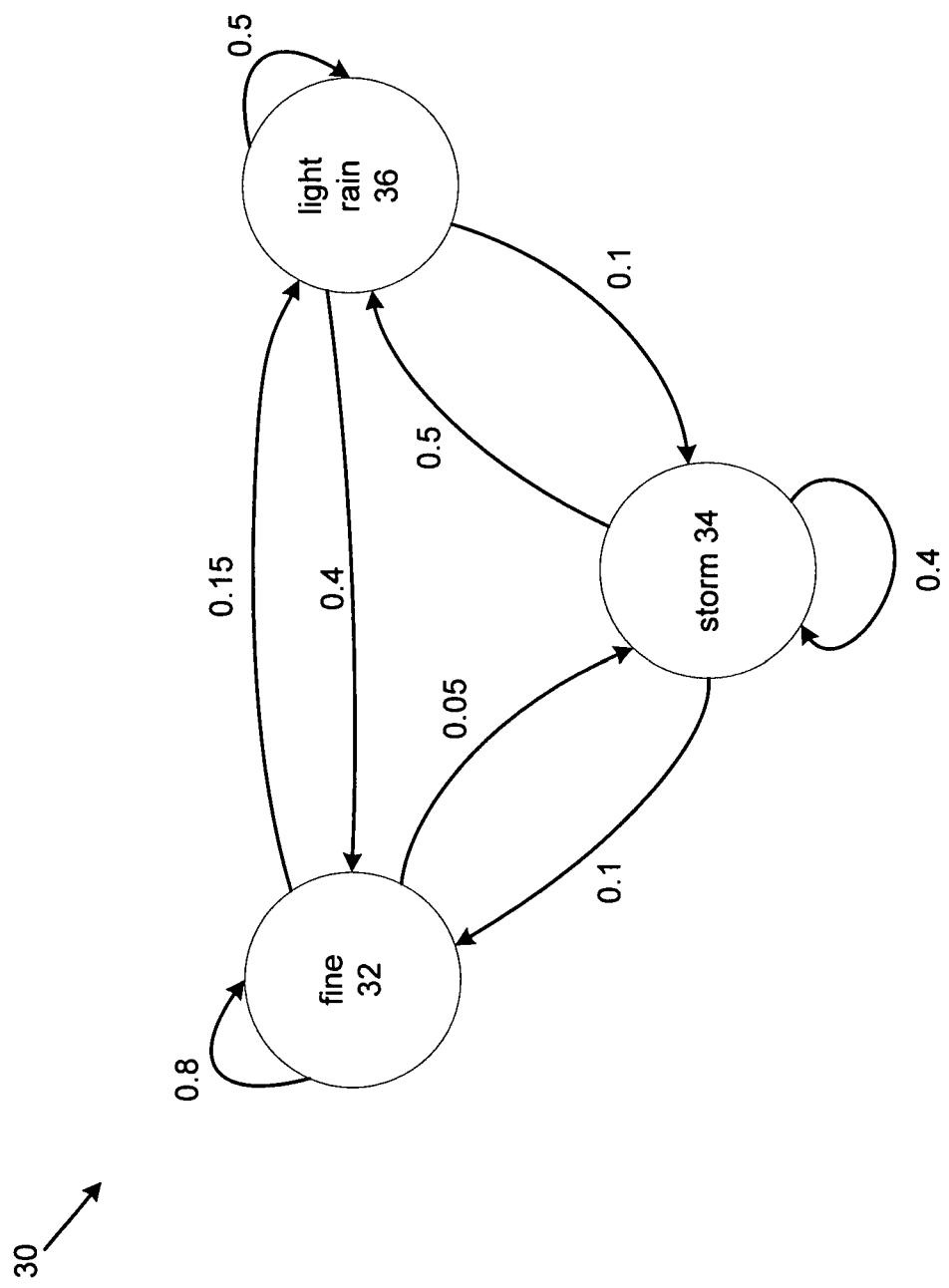
FIG. 3 is a diagram of a phenomena state model.

The phenomena states are modelled at the node as a finite state machine 30, for example as shown in FIG. 3. In the example presented a soil moisture sensor collects data that represents weather conditions (phenomena), and the state machine is able to enter one of three states: 'fine' 32, 'storm' 34, or 'light rain' 36. The arrows between each state and itself and the other states, are marked with transition weights. The transition weights between the states represent the probability of the corresponding state transitions occurring.

Low probability transitions represent events that are more unusual. The model is arranged to respond to changes in the most likely state of the phenomena by increasing or decreasing a node's sensor sampling rates. In this way the sensors of that node capture information with high temporal granularity during events of greater interest. For example, a transition from fine to storm has the lowest probability of any transition, namely 0.05, so a change associated with this transition, such as an increase in moisture content from a low level, may cause the transition to be monitored with the highest sampling rate available to the soil moisture sensor.

Figure 4:
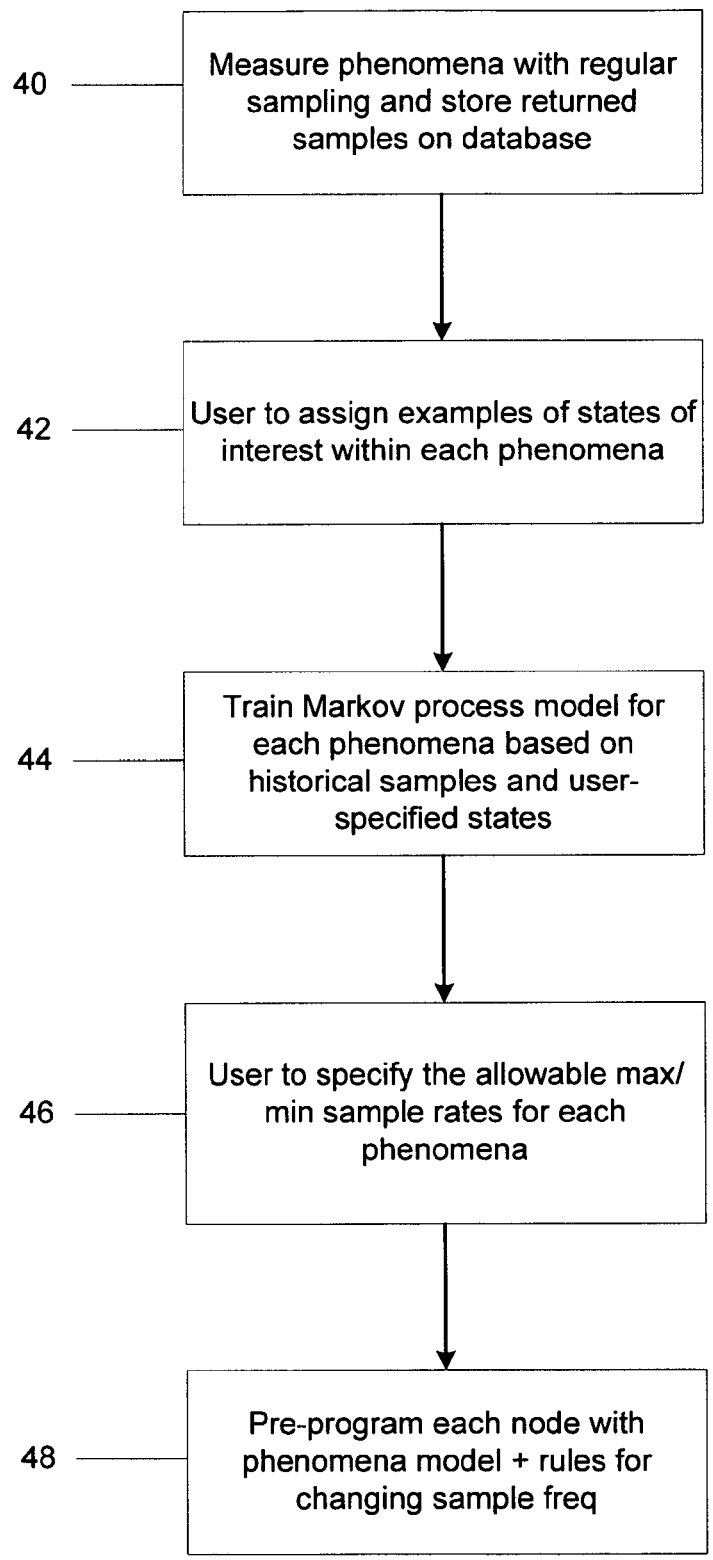
FIG. 4 is a flowchart of an offline learning process.

The detailed operational flow of the offline learning and training model 16 is shown in FIG. 4. The model relies on historical data being collected at regular sampling intervals 40. The user then assigns the phenomena and states to each sensor in the deployed sensor network 42. For each phenomenon, the user-defined states and the historical data are consumed by a Markov training process 44 to determine state transition probabilities. The user then specifies the maximum and minimum sampling rates 46 for each sensor and sensor node 10. The phenomena model and sampling rules are then pre-programmed 48 on the sensor nodes 10.

Figure 5:
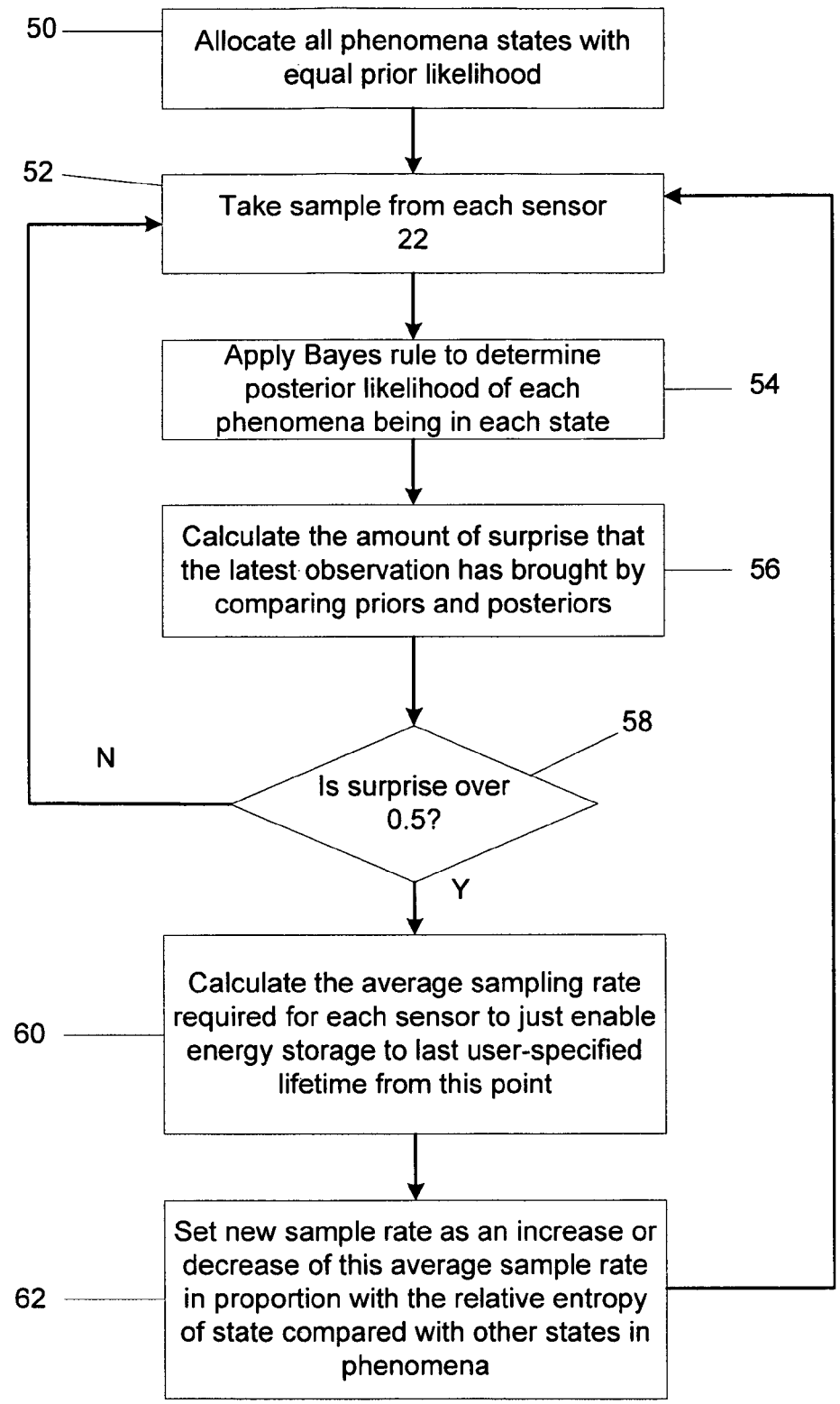
FIG. 5 is a flowchart of an online decision process.

FIG. 5 shows the online decision process of a sensor node 10 during use. In this example all phenomena states are initially considered to have an earlier likelihood of 50/100. Once operates commences, during every data sampling period, the sensor node 10 obtains a data sample 52 from each of its sensors 22; see FIG. 6(b)(ii). The node 10 then locally determines 54 the future likelihood for each phenomena being in each state, using Baye's rule [11]

Considering again an example where a sensor node is measuring the phenomena of daylight using light sensors. The rate of change of the phenomena is monitored, to provide a 'level of surprise', see FIG. 6(c) from which 'surprise peaks' can be identified. In this case small surprises 61 occur every day at dusk, and big surprises occur each day at dawn 62. Then by comparing incoming measurements with the probability mass function (PMF) combined with the earlier and future likelihoods of each state, a decision process calculates an index of 'surprise' for the latest samples 56. If the surprise index exceeds 58 a threshold surprise value 66 (in FIG. 5 shown as 0.5), then the node calculates the highest average sampling rate that will still result in the energy stored at the node being sufficient to continue operating the node for the user-specified lifetime 60; see FIG. 6(a)(ii).

Surprises generally occur when a change in the most likely state occurs, and in this case that happens at the beginning of dawn and sunset. The sensor node then sets the new sample rate for its sensors 62 as more or less than this average sample rate, in proportion with the relative entropy of the state compared with other states of the phenomena. FIG. 6(d) shows how this mechanism is used to change the sampling rate from a low rate during the night 68, and a higher rate 69 during the day.

Although the invention has been described with reference to a particular example, it will be appreciated that many modifications and variations are possible. For instance, the parameters used to map between the sampling frequency and the level of 'surprise' in the phenomena can be varied. Additional user policies could also be added to add a preference to certain types of nodes. The way in which states for each phenomena are learnt could also be changed.

REFERENCES

U.S. Pat. No. 7,318,010; "Method of regulating wireless sensor network energy use"
US 2006/0095518 "Software application for modular sensor network node"
US 2008/0309480 "Operating method of wireless sensor networks considering energy efficiency"
WO/2007/125462 "Method and apparatus for controlling energy expanding of sensor network nodes"
[1] C. Alippi and C. Galperti. An adaptive system for optimal solar energy harvesting in wireless sensor network nodes. IEEE Transactions on Circuits and Systems, 55(6):1742-1750, 2008.
[2] A. Deshpande, C. Guestrin, S. R. Madden, J. M. Hellerstein, and W. Hong. Model-driven data acquisition in sensor networks. In Proc of International Conference on Very Large Databases (VLDB), pages 588-599, 2004.
[3] P. Dutta, J. Hui, J. Jeong, S. Kim, C. Sharp, J. Taneja, G. Tolle, K. Whitehouse, and D. Culler. Trio: En-abling sustainable and scalable outdoor wireless sensor network deployments. In International Conference on Information Processing in Sensor Networks (IPSN), pages 407-415, 2006. Limits of Wireless Sensor Networks, pages 1121-1129, 2004.
[4] J. Hsu, S. Zahedi, A. Kansal, M. Srivastava, and V. Raghunathan. Adaptive duty cycling for energy harvesting systems. In Int Symposium on Low Power Electronics and Design (ISPLED), pages 180-185, 2006.
[5] J. Jeong, X. Jiang, and D. Culler. Design and analysis of micro-solar power systems for wireless sensor networks. In Int Conf on Networked Sensing Systems (INSS), pages 182-188, 2008.
[6] X. Jiang, J. Polastre, and D. Culler. Perpetual environmentally powered sensor networks. In Proc of the 4th International Symposium on Information Processing in Sensor Networks, 2005.
[7] X. Jiang, J. Taneja, J. Ortiz, A. Tavakoli, P. Dutta, J. Jeong, D. Culler, P. Levis, and S. Shenker. An architecture for energy management in wireless sensor networks. In International Workshop on Wireless Sensor Network Architecture (WWSNA), 2007.
[8] R. Jurdak, A. G. Ruzzelli, and G. M. O'Hare. Adaptive radio modes in sensor networks: How deep to sleep? In Int Conf on Sensor, Mesh and Ad Hoc Communications and Networking (IEEE SECON), 2008.
[9] A. Kansal, J. Hsu, S. Zahedi, and M. Srivastava. Power management in energy harvesting sensor networks. ACM Tran on Embedded Computing Systems, 6(4), 2006.
[10] A. Krause, C. Guestrin, A. Gupta, and J. Kleinberg. Near-optimal sensor placements: Maximising information while minimizing communication cost. In International Conference on Information Processing in Sensor Networks (IPSN), pages 2-10, 2006.
[11] Bayes, T. 1764. "An Essay Toward Solving a Problem in the Doctrine of Chances", Philosophical Transactions of the Royal Society of London 53, 370-418.

The invention claimed is:

1. A wireless sensor node configured to operate for a given lifetime, comprising:
    an onboard computer system; and
    a set of one or more associated sensors;
    wherein, the computer system is configured to:
        periodically sample data from each sensor of the set of associated sensors to obtain sampled data,
        store a multi-state model representing one or more phenomena described by the sampled data;
        calculate a transition value associated with a transition of the phenomena between the states of the multi-state model, the transition value defining a likelihood of the transition; and
        adjust a rate of sampling of one or more of the set of associated sensors depending on the transition value defining the likelihood of the transition.

2. The wireless sensor node according to claim 1, wherein the multi-state model includes an entropy for each state, defining the average information contained in the phenomena when in that state.

3. The wireless sensor node according to claim 2, wherein the multi-state model also includes a probability mass function (PMF) for each state to describe a likelihood of a measurement returning a particular value while the phenomena is in that state.

4. The wireless sensor node according to claim 2, wherein the multi-state model further includes a transition weight for each respective transition between states, defining the likelihood of each transition; or no transition.

5. The wireless sensor node according to claim 2, wherein the computer system is configured, during each cycle of operation, to:
  collect a set of fresh data from the set of sensors;
  use the fresh set of data to generate a new likelihood value for the most likely state the phenomena is in;
  calculate a value representing an index of surprise associated with movements of the phenomena, by comparing the new likelihood value with the immediately preceding likelihood value;
  compare the value representing the index of surprise with a threshold; calculate, depending on the outcome of the comparison with the threshold, a new highest average sampling rate for the node in that state that will still result in the energy stored at the node being sufficient to continue operating the node for the user-specified lifetime; and,
  set a new sampling rate for each sensor of the node, either above or below the new highest average sample rate, in proportion with the likelihood (PMF) of that node's current most likely state compared to the other states of the phenomena.

6. The wireless sensor node according to claim 1, wherein the multi-state model also includes a probability mass function (PMF) for each state to describe a likelihood of a measurement returning a particular value while the phenomena is in that state.

7. The wireless sensor node according to claim 6, wherein the multi-state model further includes a transition weight for each respective transition between states, defining the likelihood of each transition; or no transition.

8. The wireless sensor node according to claim 6, wherein the computer system is configured, during each cycle of operation, to:
  collect a set of fresh data from the set of sensors;
  use the fresh set of data to generate a new likelihood value for the most likely state the phenomena is in;
  calculate a value representing an index of surprise associated with movements of the phenomena, by comparing the new likelihood value with the immediately preceding likelihood value;
  compare the value representing the index of surprise with a threshold;
  calculate, depending on the outcome of the comparison with the threshold, a new highest average sampling rate for the node in that state that will still result in the energy stored at the node being sufficient to continue operating the node for the user-specified lifetime; and,
  set a new sampling rate for each sensor of the node, either above or below the new highest average sample rate, in proportion with the likelihood (PMF) of that node's current most likely state compared to the other states of the phenomena.

9. The wireless sensor node according to claim 1, wherein the multi-state model further includes a transition weight for each respective transition between states, defining the likelihood of each transition; or no transition.

10. The wireless sensor node according to claim 1, wherein the computer system is configured, during each cycle of operation, to:
  collect a set of fresh data from the set of sensors;
  use the fresh set of data to generate a new likelihood value for the most likely state the phenomena is in;
  calculate a value representing an index of surprise associated with movements of the phenomena, by comparing the new likelihood value with the immediately preceding likelihood value;
  compare the value representing the index of surprise with a threshold;
  calculate, depending on the outcome of the comparison with the threshold, a new highest average sampling rate for the node in that state that will still result in the energy stored at the node being sufficient to continue operating the node for the user-specified lifetime; and,
  set a new sampling rate for each sensor of the node, either above or below the new highest average sample rate, in proportion with the likelihood (PMF) of that node's current most likely state compared to the other states of the phenomena.

11. The wireless sensor node according to claim 10, wherein the node has a range of different types of sensors.

12. The wireless sensor node according to claim 11, wherein each cycle of operation of the computer system of a sensor node involves the additional step of setting a new sampling rate for each of the set of sensors associated with that sensor node, according to a predetermined regime for that state of the phenomena.

13. The wireless sensor node according to claim 1, wherein
  a statistical model automatically learns about the nature of each phenomena and determines an optimal function for assigning sampling frequencies to the state of the phenomena.

14. The wireless sensor node according to claim 13, wherein
  the computer system is configured, during each cycle of operation, to calculate a value representing an index of surprise associated with movements of the phenomena, by comparing the new likelihood value with the immediately preceding likelihood value, and
  the statistical model monitors the rate of change of the data from the sensors to identify peaks of the value representing the index of surprise.

15. The wireless sensor node according to claim 14, wherein the automatic learning takes place on a computer at the network hub.

16. The wireless sensor node according to claim 13, wherein the automatic learning takes place on a computer at the network hub.

17. The wireless sensor node according to claim 16, wherein once an optimal function is determined a corresponding algorithm may be downloaded to the node where it assigns new sampling frequencies as required.

18. A network of sensor nodes comprising:
  a plurality of sensor nodes, each sensor configured to operate for a given lifetime, comprising:
  an onboard computer system; and
  a set of one or more associated sensors;
  wherein, the computer system is configured to:
    periodically sample data from each sensor of the set of associated sensors to obtain sampled data,
    store a multi-state model representing one or more phenomena described by the sampled data;
    calculate a transition value associated with a transition of the phenomena between the states of the multi-state model, the transition value defining a likelihood of the transition; and
    adjust a rate of sampling of one or more of the set of associated sensors depending on the transition value defining the likelihood of the transition; and
  wherein each sensor node learns the minimum residual energy in its region of the network, and is able to set its sensor sampling rates in order to conserve sufficient energy at critical nodes of the network along its reporting path.

19. A method of operating a sensor node comprising an onboard computer system and a set of one or more associated sensors, wherein the node is configured to operate for a given lifetime; the method comprising the steps of:

the computer system periodically sampling data from a set of one or more sensors associated with a sensor node to obtain sampled data;

the computer system storing a multi-state model representing one or more phenomena described by the sampled data;

the computer system calculating a transition value associated with a transition of the phenomena between the states of the multi-state model, the transition value defining the likelihood of the transition; and, the computer system adjusting a rate of sampling of one or more of the set of associated sensors depending on the transition value defining the likelihood of the transition.

20. The method of claim 19 further comprising:

the computer system collecting a set of fresh data from the set of sensors;

the computer system using the fresh set of data to generate a new likelihood value for the most likely state the phenomena is in;

the computer system calculating a value representing an index of surprise associated with movements of the phenomena, by comparing the new likelihood value with the immediately preceding likelihood value;

the computer system comparing the value representing the index of surprise with a threshold;

the computer system calculating, depending on the outcome of the comparison with the threshold, a new highest average sampling rate for the node in that state that will still result in the energy stored at the node being sufficient to continue operating the node for the user-specified lifetime; and, the computer system setting a new sampling rate for each sensor of the node, either above or below the new highest average sample rate, in proportion with the likelihood (PMF) of that node's current most likely state compared to the other states of the phenomena.

* * * * *